US012171702B2

(12) United States Patent
Nomura et al.

(10) Patent No.: US 12,171,702 B2
(45) Date of Patent: Dec. 24, 2024

(54) ASSISTANCE METHOD USING ASSISTANCE DEVICE

(71) Applicant: FUJI CORPORATION, Aichi-ken (JP)

(72) Inventors: Hideaki Nomura, Toyota (JP); Nobuyuki Nakane, Toyota (JP); Kuniyasu Nakane, Okazaki (JP); Satoshi Shimizu, Chiryu (JP)

(73) Assignee: FUJI CORPORATION, Aichi-ken (JP)

( * ) Notice: Subject to any disclaimer, the term of this patent is extended or adjusted under 35 U.S.C. 154(b) by 653 days.

(21) Appl. No.: 17/295,433

(22) PCT Filed: Dec. 6, 2018

(86) PCT No.: PCT/JP2018/044896
§ 371 (c)(1),
(2) Date: May 19, 2021

(87) PCT Pub. No.: WO2020/115857
PCT Pub. Date: Jun. 11, 2020

(65) Prior Publication Data

US 2022/0008267 A1 Jan. 13, 2022

(51) Int. Cl.

| | |
|---|---|
| ***A61G 5/14*** | (2006.01) |
| ***A61G 7/10*** | (2006.01) |
| ***A61H 33/00*** | (2006.01) |

(52) U.S. Cl.
CPC ............. *A61G 5/14* (2013.01); *A61G 7/1086* (2013.01); *A61H 33/00* (2013.01); *A61G 2203/22* (2013.01); *A61G 2203/70* (2013.01)

(58) Field of Classification Search
CPC .... A61G 5/14; A61G 7/1086; A61G 2203/22; A61G 2203/70; A61H 33/00
(Continued)

(56) References Cited

U.S. PATENT DOCUMENTS

| | | | | |
|---|---|---|---|---|
| 7,346,941 B1 * | 3/2008 | Ein | A61G 7/1086 5/81.1 R |
| 2011/0083267 A1 * | 4/2011 | Gibson | A61G 5/14 5/87.1 |

(Continued)

FOREIGN PATENT DOCUMENTS

| | | |
|---|---|---|
| CN | 106618826 | 5/2017 |
| CN | 108451417 | 8/2018 |

(Continued)

OTHER PUBLICATIONS

"International Search Report (Form PCT/ISA/210) of PCT/JP2018/044896," mailed on Mar. 5, 2019, with English translation thereof, pp. 1-2.

*Primary Examiner* — Tuan N Nguyen
(74) *Attorney, Agent, or Firm* — JCIPRNET

(57) ABSTRACT

The assistance method using an assistance device including a base, a support section configured to lift and lower the upper body of a care receiver with respect to the base while supporting the upper body of the care receiver from the front, and a driving section configured to drive the support section. The assistance device is configured to be waterproof. The assistance method includes a boarding step for boarding the seated care receiver onto the assistance device; and a rear side washing step for washing the body of the care receiver while the buttocks of the care receiver is lifted by lifting the support section.

7 Claims, 12 Drawing Sheets

(58) Field of Classification Search
USPC .............................................. 4/604, 611, 667
See application file for complete search history.

(56) References Cited

U.S. PATENT DOCUMENTS

| | | | | |
|---|---|---|---|---|
| 2016/0220432 A1* | 8/2016 | Ooyama | .................. | A61G 5/14 |
| 2019/0183706 A1* | 6/2019 | Shimizu | .................. | A61G 5/14 |

FOREIGN PATENT DOCUMENTS

| | | | | |
|---|---|---|---|---|
| EP | 1772132 A1 * | 4/2007 | ........... | A61G 7/1007 |
| GB | 2340388 A * | 2/2000 | ............... | A61G 5/14 |
| JP | H06169968 | 6/1994 | | |
| JP | 2008502438 | 1/2008 | | |
| JP | 2012045068 | 3/2012 | | |
| JP | 2016165313 | 9/2016 | | |
| JP | 6087405 | 3/2017 | | |
| JP | 6142116 | 6/2017 | | |
| WO | 2017199348 | 11/2017 | | |

* cited by examiner

ASSISTANCE METHOD USING ASSISTANCE DEVICE

CROSS-REFERENCE TO RELATED APPLICATION

This application is a 371 application of the International PCT application serial no. PCT/JP2018/044896, filed on Dec. 6, 2018. The entirety of the above-mentioned patent application is hereby incorporated by reference herein and made a part of this specification.

TECHNICAL FIELD

The present specification relates to an assistance method using an assistance device.

BACKGROUND ART

The need for assistance devices is increasing with the aging of society. For example, Patent Literature 1 discloses a technique for boarding a care receiver from a bed to a boarding support robot using a dedicated seat. Patent Literature 2 discloses an assistance device for assisting the boarding operation of a care receiver from a sitting posture. Patent Literature 3 discloses a wheelchair in which a care receiver can be bathed while the care receiver is boarded.

PATENT LITERATURE

Patent Literature 1: JP-6142116
Patent Literature 2: JP-A-2016-165313
Patent Literature 3: JP-A-6-169968

SUMMARY OF THE INVENTION

Technical Problem

In the technique described in Patent Literature 3, the caregiver can assist in bathing while the care receiver is placed in a wheelchair, but it is difficult to thoroughly wash the buttocks and the periphery of the buttocks of the care receiver while the care receiver remains seated. Further, in a case where a second caregiver washes the buttocks and the periphery of the buttocks of the care receiver while the first caregiver supports the care receiver whose buttocks are lifted, the physical burden is large on the first caregiver who supports the care receiver.

It is an object of the present disclosure to solve the above-described problem by providing an assistance method using an assistance device configured to thoroughly wash the buttocks and the periphery of the buttocks of a care receiver while reducing the physical burden on the caregiver when assisting the care receiver in bathing.

Solution to Problem

The present specification discloses an assistance method using an assistance device including a base, a support section configured to lift and lower the upper body of a care receiver with respect to the base while supporting the upper body of the care receiver from a front of the care receiver, and a driving section configured to drive the support section. The assistance device is configured to be waterproof; and the assistance method includes: a boarding step for boarding a seated care receiver onto the assistance device; and a rear side washing step for washing a body of the care receiver while buttocks of the care receiver are lifted by lifting the support section.

ADVANTAGEOUS EFFECT OF THE INVENTION

With the assistance method using the assistance device disclosed in the present specification, the assistance device can be used in a bathroom since the assistance device is configured to be waterproof. Further, by supporting the upper body of the care receiver from the front using the assistance device, the care receiver can be maintained in a state in which the buttocks of the care receiver are lifted and the body of the care receiver can be washed in this state. As a result, the assistance method using the assistance device makes it possible to thoroughly wash the buttocks and the periphery of the buttocks of the care receiver while reducing the physical burden on the caregiver when assisting the care receiver in bathing. Further, since the assistance method using the assistance device supports the upper body of the care receiver with the support section, the care receiver can more easily place the weight of the care receiver on the support section compared with the case in which a caregiver supports the upper body of the care receiver. As a result, the assistance method using the assistance device can safely assist in bathing the care receiver.

DESCRIPTION OF EMBODIMENTS

1. Main Mode of use of Assistance Device 1

Hereinafter, an embodiment will be described with reference to the drawings to which an assistance method using the assistance device disclosed in the specification is applied. First, a main mode of use of assistance device 1 will be described with reference to FIG. 1.

Assistance device 1 is mainly used when caregiver G assists in bathing, dressing, or undressing care receiver M. For example, caregiver G can cause the buttocks of care receiver M to rise while supporting the upper body of care receiver M from the front using assistance device 1. Further, caregiver G can maintain a state in which care receiver M raises the buttocks using assistance device 1. Further, caregiver G can move assistance device 1 while care receiver M is placed on assistance device 1.

2. Schematic Configuration of Assistance Device 1

Figure 1:
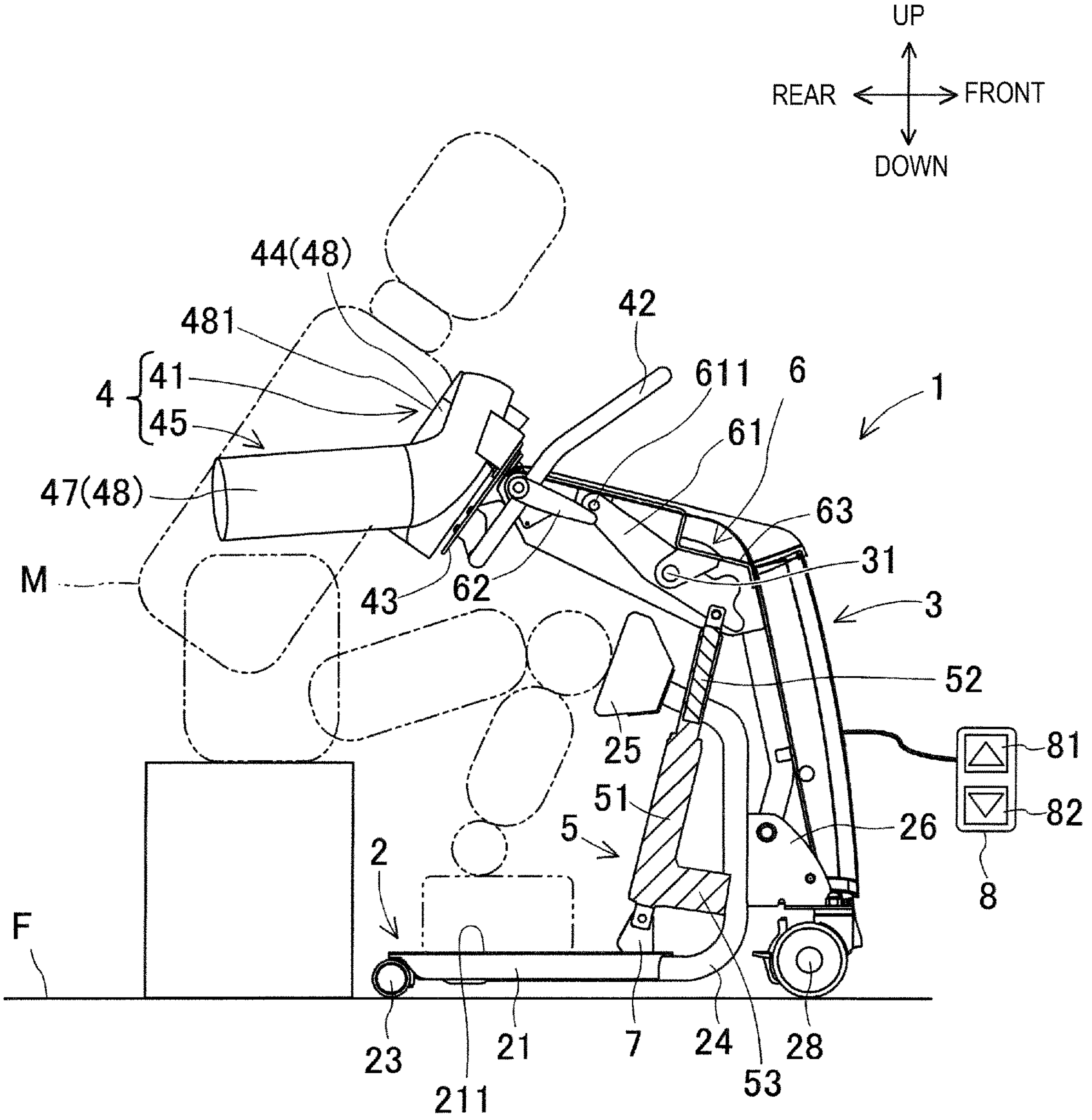
FIG. 1 is a partial cross-sectional side view of an assistance device of an embodiment, showing an initial state when a care receiver is on board the assistance device.

Next, a schematic configuration of assistance device 1 will be described with reference to FIG. 1. As shown in FIG. 1, assistance device 1 mainly consists of base 2, arm 3, support section 4, actuator 5, link mechanism 6, shock absorbing mechanism 7, and a control section (not shown).

Base 2 mainly consists of footrest 21, rear wheel 23, base rods 24, lower leg contact 25, a pair of left and right mounting plates 26, and a pair of left and right front wheels 28. Footrest 21 is disposed at a position close to floor F. Footrest 21 includes footrest surface 211 forming the top surface of footrest 21. Footrest surface 211 is a portion on which care receiver M places his/her feet and is approximately horizontal.

The pair of left and right rear wheels 23 are provided on the left and right at the rear of footrest 21. The pair of left and right base rods 24 are provided so as to face forward from the left and right sides of the front face of footrest 21. Base rods 24 are bent upward from the front and then extended so as to incline rearward. Lower leg contact 25 is provided on the upper portion of the two base rods 24 and faces rearward. Lower leg contact 25 is located above the front side of footrest 21 and is provided at a position where the vicinity of the lower legs of care receiver M can come in contact with lower leg contact 25.

Since assistance device 1 is made on the assumption that it is to be used in a bathroom, lower leg contact 25 is waterproof. For example, lower leg contact 25 is made of a cushion member, made of highly waterproof foam having an open-cell structure, covered with a highly waterproof lower-leg contact cover. Further, footrest surface 211 is subjected to a slip prevention treatment to prevent care receiver M from slipping while on his/her feet. In this way, assistance device 1 prevents care receiver M on board from slipping while on his/her feet and falling. Examples of the slip prevention treatment include forming uneven surfaces on footrest surface 211, applying a coating agent having a slip-preventing effect, and the like.

The pair of right and left mounting plates 26 are fixed at positions slightly upward along the bent portions which bend upward from the front of each base rod 24 and are each disposed facing each other. Mounting plates 26 extend forward from each base rod 24. The pair of left and right front wheels 28 are provided on the underside at the front of the pair of left and right mounting plates 26. Steering functions of front wheels 28 and rear wheels 23 allow assistance device 1 to not only move straight and turn but also move sideways and spin in place. With this configuration, caregiver G can easily move assistant device 1. Further, front wheels 28 have a locking function for restricting movement. In this way, caregiver G can safely board care receiver M on assistance device 1 by restricting the movement of assistance device 1 when care receiver M is boarded on assistance device 1.

Arm 3 is supported so as to be pivotable in the front-rear direction with respect to mounting plates 26. The forward swinging motion of arm 3 corresponds to the erecting direction in which care receiver M is made to stand, and the rearward swinging motion corresponds to the seating direction in which care receiver M is seated. Further, a battery (not shown) serving as the power source for actuator 5 and a control section (not shown) is housed in arm 3. The battery is waterproof.

Support section 4 mainly has trunk support section 41 and a pair of left and right support portions 45. Trunk support section 41 is a section that supports the upper body of care receiver M from the front. Trunk support section 41 consists of handle 42, base plate 43, and trunk contact member 44. Handle 42 has an approximate rectangular frame shape. Handle 42 is a part grasped by care receiver M and is also a part grasped by caregiver G to move assistance device 1.

Base plate 43 is a member having an approximate rectangular shape and is made of a highly rigid plate material such as metal or a resin. Base plate 43 is supported so that base plate 43 can swing in the front-rear direction with respect to the upper portion of arm 3. The forward swing of support section 4 corresponds to the erecting direction for erecting care receiver M, and the rear swing corresponds to the seating direction for seating care receiver M. Handle 42 is integrally fixed to base plate 43 in a manner which allows handle 42 to swing. Trunk contact member 44 is attached to the top face of base plate 43. Trunk contact member 44 is a portion which comes in contact with the upper body of care receiver M and is made of a material having higher flexibility than base plate 43.

The pair of right and left underarm support portions 45 are attached to the right and left chest areas of trunk support section 41. Each underarm support portion 45 has an L-shape that bends at an obtuse angle. The short straight portion from the proximal end of each underarm support portion 45, which is the attachment side, to the bending point becomes a shoulder receiving portion, and the long straight portion from the bending point to the distal end becomes a side entry portion. The shoulder receiving portions support the front shoulder surfaces of care receiver M, and the side entry portions enter both sides of the torso of care receiver M.

Each underarm support portion 45 mainly consists of a core member (not shown) and outer peripheral member 47. The core member is formed, for example, by bending a circular rod or a pipe made of metal, a hard resin, or the like. Outer peripheral member 47 is a cylindrical member that covers the outer periphery of the core member and is made of a material having higher flexibility than the core member.

Support section 4 is waterproof. Specifically, trunk contact member 44 and outer peripheral member 47 are entirely covered with support section cover 48 having high water resistance. In this way, support section 4 can prevent water from entering the inside of support section cover 48 even if trunk support section 41 is wet. Further, since support section cover 48 is detachably attached to support section 4, caregiver G can exchange support section cover 48 as needed. In this way, assistance device 1 keeps support section cover 48 clean.

In addition, trunk contact member 44 and outer peripheral member 47 are made of a cushion material having high water resistance. In this way, as for support section 4, even if water enters the inside of support section cover 48, moisture adhering to trunk contact member 44 and outer peripheral member 47 can be wiped off by removing support section cover 48. An example of cushion material that can be used for trunk contact member 44 and outer peripheral member 47 is foam having an open-cell structure. In addition, trunk contact member 44 may be detachably attached to base plate 43, and outer peripheral member 47 may be detachably attached to cylindrical member. As a result, caregiver G can exchange trunk contact member 44 and outer peripheral member 47 as required.

In addition, slip-preventing portion 481 is formed on support section cover 48. Slip-preventing portion 481 is, for example, an uneven surface. Slip-preventing portion 481 is provided on a portion of support section cover 48 that comes in contact with care receiver M when care receiver M is supported mainly by support section 4. Slip-preventing portion 481 has a function of preventing care receiver M from slipping with respect to support section cover 48 when care receiver M contacts support section cover 48 when support section cover 48 or care receiver M is wet. In this way, assistance device 1 prevents care receiver M from falling when assistance device 1 is used in a bathroom.

Actuator 5 mainly consists of main body portion 51, movable portion 52, and motor 53. Main body portion 51 is a cylindrical member. The lower end of main body portion 51 is connected to base 2 via shock absorbing mechanism 7 provided at the center in the left-right direction at the front of footrest 21. Movable portion 52 is a circular rod-shaped member housed in main body portion 51. Movable portion 52 is provided so as to be retractable from the upper end of main body portion 51.

Motor 53 is attached to the lower front side of main body portion 51. The direction of current flowing through motor 53 is controlled by a control section (not illustrated). Movable portion 52 protrudes and retracts with respect to main body portion 51 by the driving of motor 53, causing actuator 5 to expand and contract. It should be noted that actuator 5 may use another type of driving source such as a pressure driving source using oil pressure or air pressure instead of motor 53. Further, actuator 5 is waterproof.

Here, actuator 5, being waterproof, is generally expensive compared with an actuator that is not waterproof. In this regard, since assistance device 1 lifts and lowers support section 4 using one actuator 5 as a driving source, it is possible to suppress the component cost of the entire assistance device 1.

Link mechanism 6 mainly consists of first link member 61, second link member 62, and restricting member 63. First link member 61 is supported in a swingable manner by support shaft 31 provided on arm 3. First link member 61 is connected to the upper end of movable portion 52 in front of support shaft 31 shown in FIG. 1. In addition, engaging pin 611 protrudes from first link member 61, to the rear of support shaft 31 shown in FIG. 1, in a manner which allows engagement with second link member 62. Engaging pin 611 pushes down second link member 62 when first link member 61 swings in the counterclockwise direction shown in FIG. 1.

The front end of second link member 62 is located below engaging pin 611 provided on first link member 61. The rear end of second link member 62 is fixed to base plate 43, and support section 4 and second link member 62 swing integrally with respect to arm 3. Restricting member 63 is fixed to arm 3 at a position above first link member 61 where contact with first link member 61 is possible. In the state shown in FIG. 1, there is a gap between first link member 61 and restricting member 63.

The control section (not shown) is composed of operating device 8, a control main body, and the like. Operating device 8 has up button 81 and down button 82 for operating actuator 5. Operating device 8 is operated by caregiver G. The control main body is configured with a computer device having a CPU and is operated by software. The control body controls the presence or absence of current flowing through motor 53 of actuator 5 and the direction of the current in accordance with the operation information of up button 81 and down button 82. Actuator 5 expands continuously while up button 81 is pressed and retracts continuously while down button 82 is pressed. Actuator 5 stops extending when it has reached an extension limit, and stops retracting when it has reached to a retraction limit.

3. Operation Mode of Assistance Device 1

Next, the operation mode of assistance device 1 will be described. Here, the operation mode of assistance device 1 when shifting from a state in which care receiver M is placed in a sitting state to a state in which the buttocks are lifted will be described. As shown in FIG. 1, caregiver G first grasps handle 42 to move assistance device 1 in front of care receiver M who is seated.

Thereafter, care receiver M inserts his/her lower body into the space below support section 4 and places both feet on footrest 21. At this time, care receiver M can stabilize the posture by making a portion of the lower legs come in contact with lower leg contact 25. Subsequently, care receiver M tilts forward in the seated state and rests on underarm support portions 45 on both sides while his/her upper body comes in contact with trunk support section 41. In this manner, care receiver M boards assistance device 1. It should be noted that caregiver G may assist the series of boarding operations of care receiver M described above.

Here, in the state shown in FIG. 1, second link member 62 can swing in the clockwise direction shown in FIG. 1. Accordingly, care receiver M can expand the area below support section 4 by swinging support section 4 toward the front. As a result, care receiver M can easily enter the area below support section 4.

Thereafter, care receiver G presses up button 81 of operating device 8. While care receiver G presses up button 81, actuator 5 extends, pushing up the front side of first link member 61 connected to movable portion 52. Accordingly, first link member 61 swings in the counterclockwise direction shown in FIG. 1, and engaging pin 611 provided at the rear of first link member 61 pushes down second link member 62. As a result, second link member 62 swings in the clockwise direction shown in FIG. 1, and support section 4 swings in the forward direction (i.e., the erecting direction). In this way, by being driven by actuator 5 serving as a driving section, support section 4 moves up and down with respect to base 2.

Figure 2:
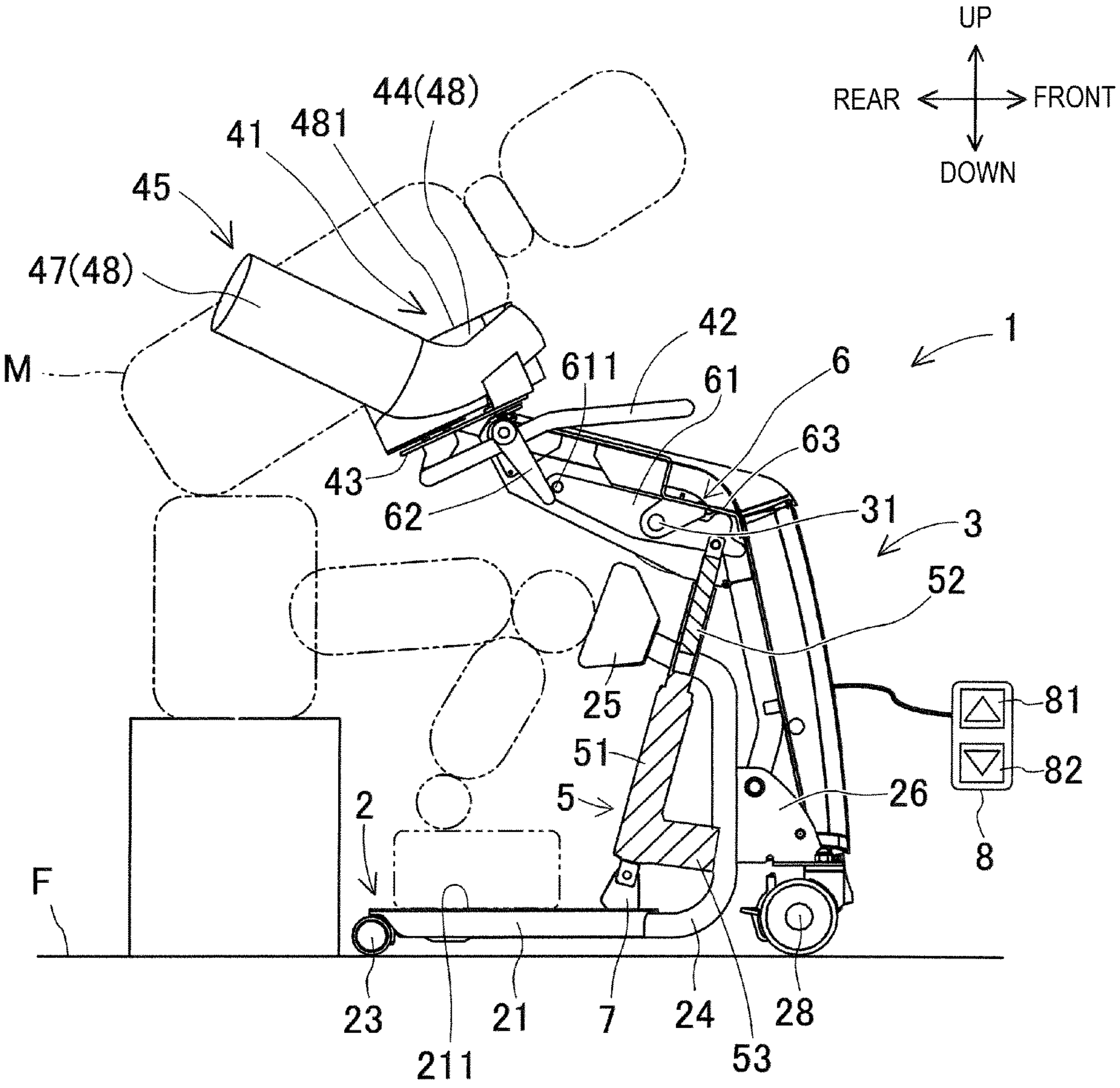
FIG. 2 is a partial cross-sectional side view of the assistance device, showing an operation process of the assistance device when the buttocks of the care receiver are lifted from a chair.

As shown in FIG. 2, when actuator 5 extends to a predetermined length from the state shown in FIG. 1, underarm support portions 45 are moved downward toward the front. As a result, rearward movement of care receiver M is restricted by underarm support portions 45. In the state shown in FIG. 2, first link member 61 contacts restricting member 63, restricting the swinging motion of first link member 61 with respect to arm 3. As a result, the swinging motion of support section 4 with respect to arm 3 is restricted.

Then, when actuator 5 further extends from the state shown in FIG. 2, arm 3 is pushed up by actuator 5 via first link member 61 and swings in the clockwise direction shown in FIG. 2 with respect to base 2. In addition, actuator 5 tilts forward as the connecting position of movable portion 52 and first link member 61 is displaced. On the other hand, support section 4 maintains a constant orientation with respect to arm 3.

Figure 3:
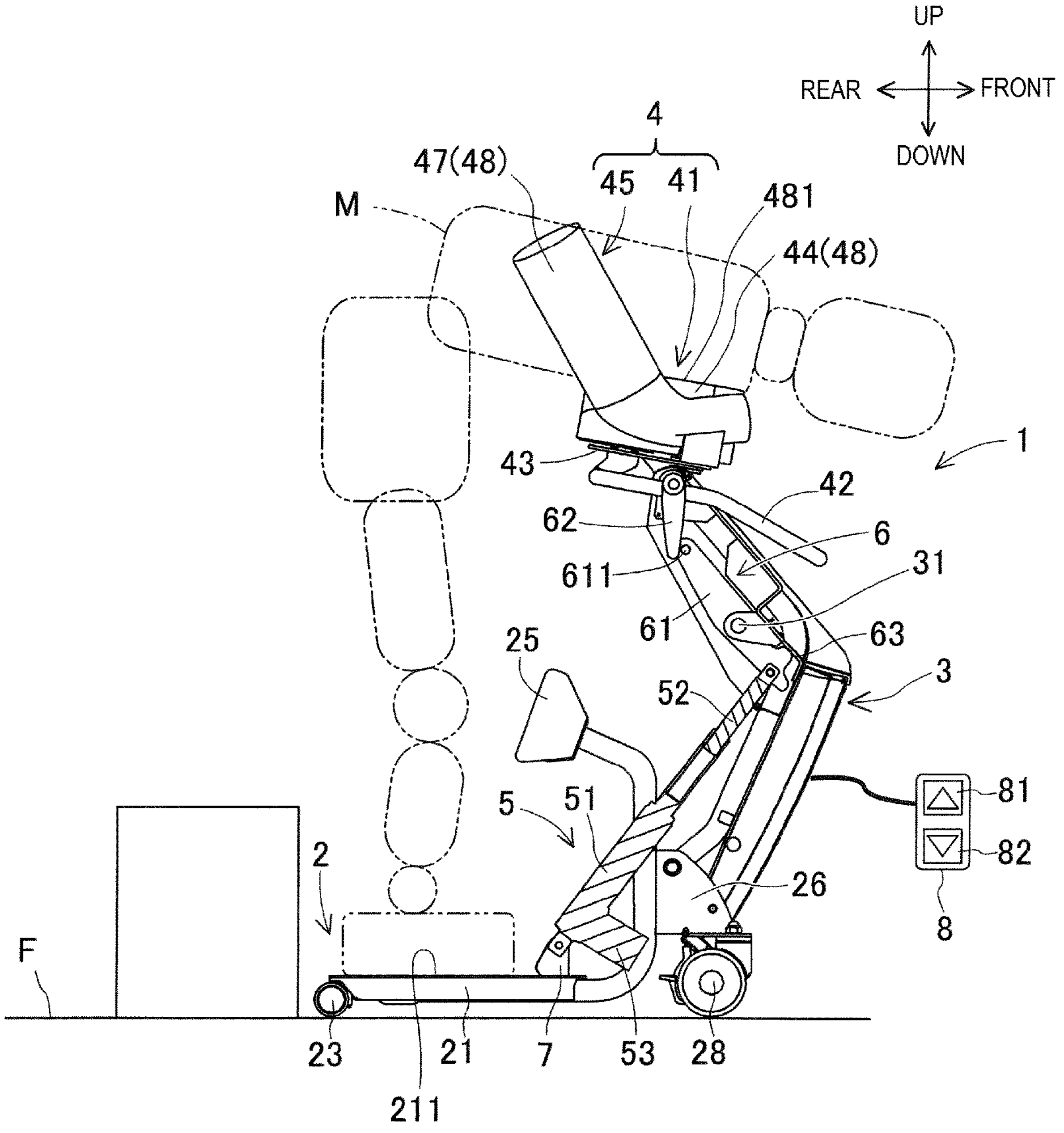
FIG. 3 is a partial side cross-sectional view of the assistance device, showing a state in which the buttocks of the care receiver are lifted from a chair.

When arm 3 swings from the state shown in FIG. 2 to the state shown in FIG. 3, care receiver M further tilts forward and the upper body of care receiver M moves obliquely upward toward the front. In this manner, caregiver G can cause the buttocks of seated care receiver M to rise while supporting the upper body of care receiver M using assistance device 1. In addition, assistance device 1 can maintain the state in which care receiver M has lifted up his/her buttocks by supporting the upper body of care receiver M whose buttocks are lifted from the front. That is, since assistance device 1 can support the upper body of care receiver M who has lifted his/her buttocks instead of caregiver G, it is possible to reduce the physical burden on caregiver G.

In addition, since assistance device 1 is configured to be waterproof, it can be used in a bathroom. For example, when performing bathing assistance of care receiver M in a bathroom, caregiver G can wash the body of care receiver M whose buttocks are lifted while supporting the upper body of care receiver M from the front using assistance device 1. As described above, caregiver G can thoroughly wash the buttocks and the periphery of the buttocks of care receiver M while reducing the physical burden on caregiver G by having the bathing of care receiver M be assisted by use of assistance device 1.

4. Procedure of Bathing Assistance

Figure 4:
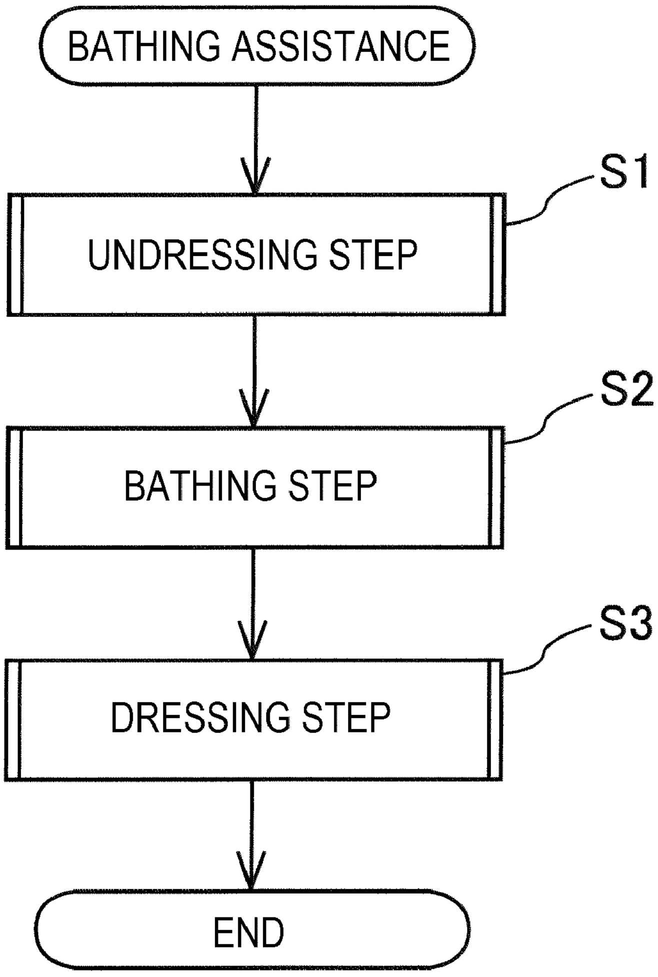
FIG. 4 is a flowchart showing the procedure of bathing assistance.

Next, an example of a procedure by which caregiver G assists care receiver M in bathing will be described with reference to the flowchart shown in FIG. 4. As shown in FIG. 4, bathing assistance consists of an undressing step (S1), a bathing step (S2), and a dressing step (S3).

The undressing step (S1) is a step in which care receiver M gets undressed after moving to a clothes-changing space with wheelchair C1. The undressing step (S1) consists of a step of assisting care receiver M in undressing using assistance device 1. The bathing step (S2) is a step in which care receiver M who has finished undressing washes himself/herself. The bathing step (S2) consists of a step of assisting care receiver M in bathing using assistance device 1. The dressing step (S3) is a step in which care receiver M who has finished bathing gets dressed. The dressing step (S3) consists of a step of assisting in dressing care receiver M using assistance device 1.

Figure 5:
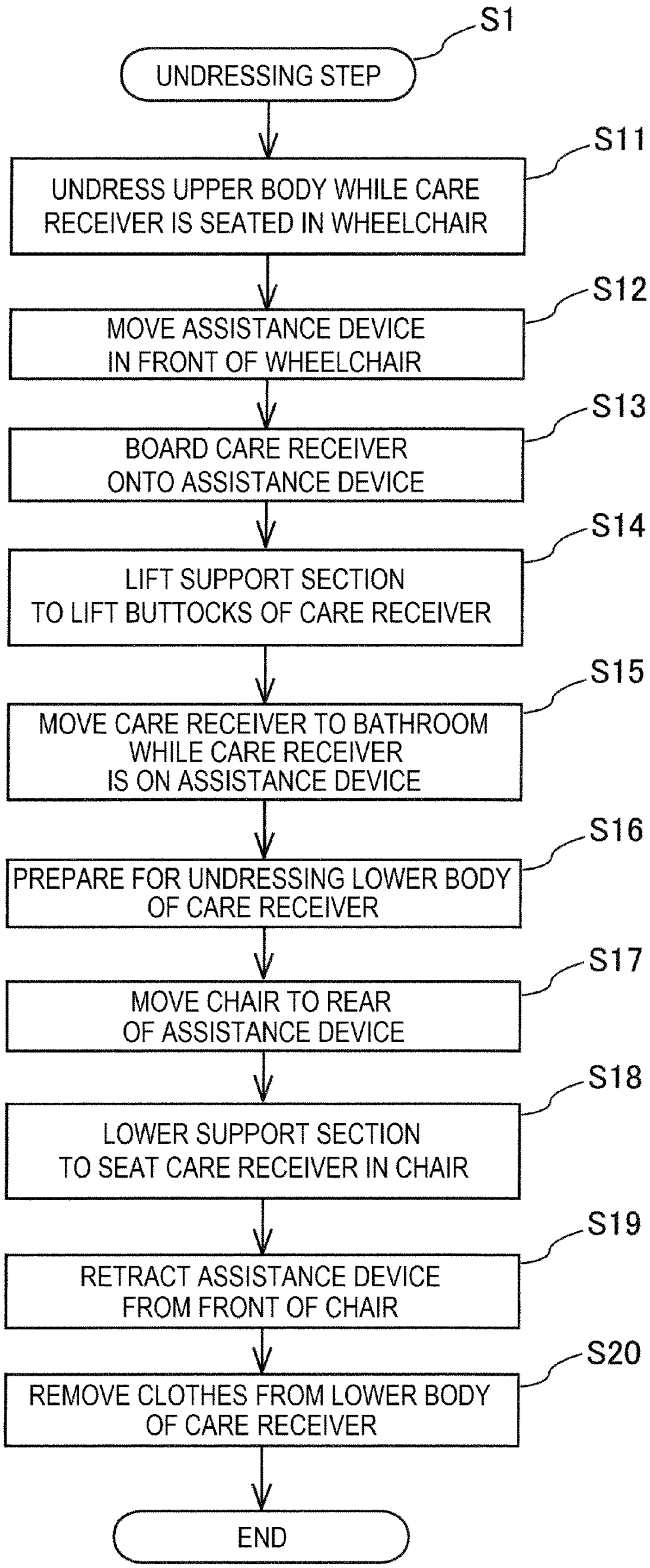
FIG. 5 is a flowchart showing an undressing step executed during bathing assistance.
Figure 6:
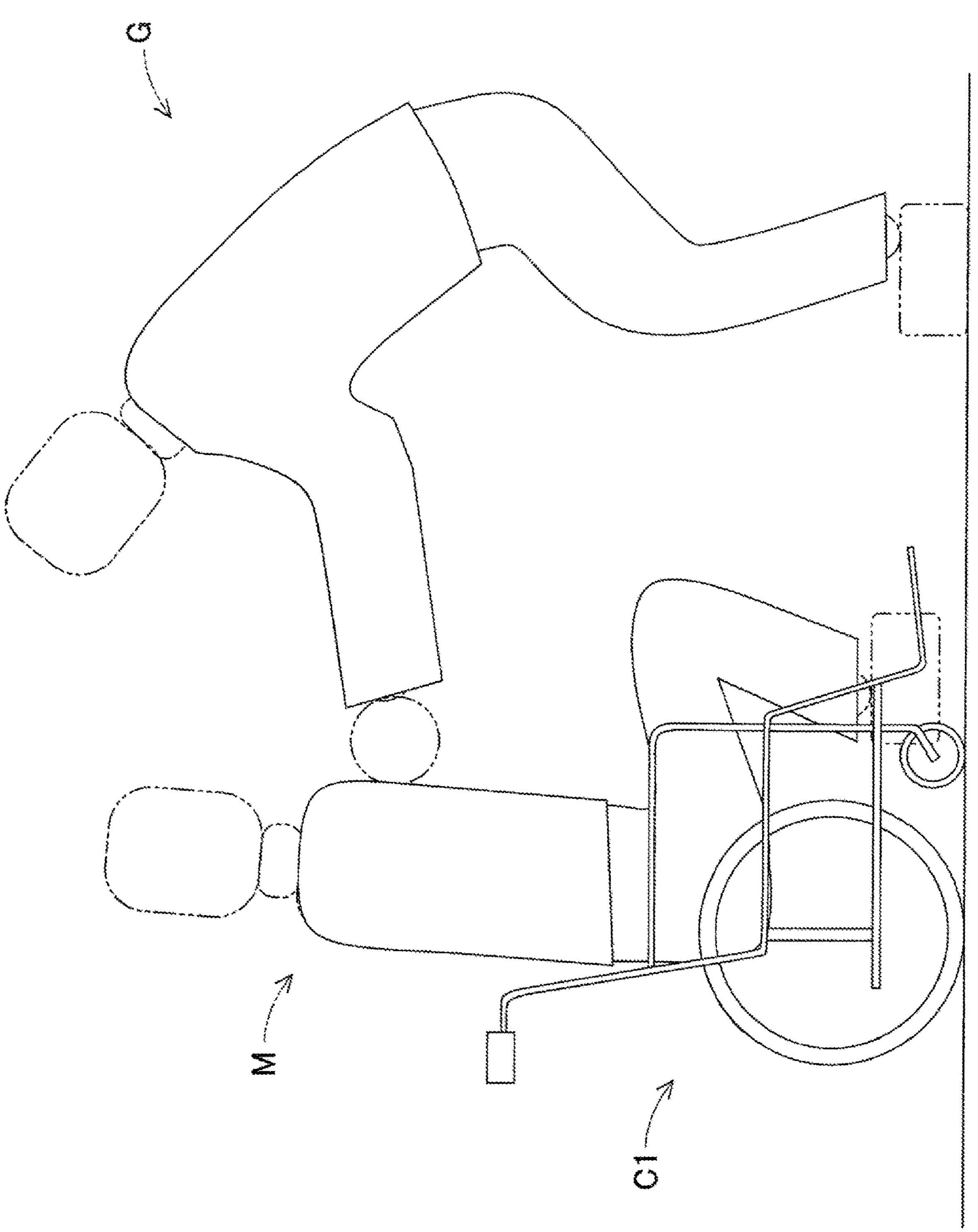
FIG. 6 is a diagram showing a process in which a caregiver assists in undressing the upper body of the care receiver.

4-1: Subsequently, the undressing step (S1) will be described with reference to the flowchart shown in FIG. 5. As shown in FIG. 5, as a first step to be performed in the undressing step (S1), caregiver G assists in removing clothes from the upper body of care receiver M while care receiver M is seated in wheelchair C1 (S11: upper body undressing step, see FIG. 6). It should be noted that in the process of S11, care receiver M may remove clothes from his/her upper body to the extent which is possible, and caregiver G does not necessarily have to entirely assist the removal of clothes from the upper body of care receiver M.

After the process of S11, caregiver G positions assistance device 1 in an area in front of wheelchair C1 (S12). In the process of S12, caregiver G moves assistance device 1 to position assistance device 1 in front of care receiver M who is seated in wheelchair C1. Thereafter, caregiver G causes care receiver M seated in wheelchair C1 to board assistance device 1 (S13). In the process of S13, care receiver M tilts forward while remaining seated in wheelchair C1, rests on underarm support portions 45 on both sides while contacting trunk support section 41 with his/her upper body (see FIG. 1).

After the process of S13, caregiver G operates operating device 8 to lift support section 4, lifting the buttocks of care receiver M from wheelchair C1 (S14). In the process of S14, caregiver G presses up button 81 of operating device 8 continuously to lift support section 4 to the state shown in FIG. 3. As a result, caregiver G can support the upper body of care receiver M whose buttocks are lifted from the front using assistance device 1. After the process of S14, caregiver G moves care receiver M from the clothes-changing space to the bathroom while care receiver M is on board assistance device 1 (S15).

Figure 7:
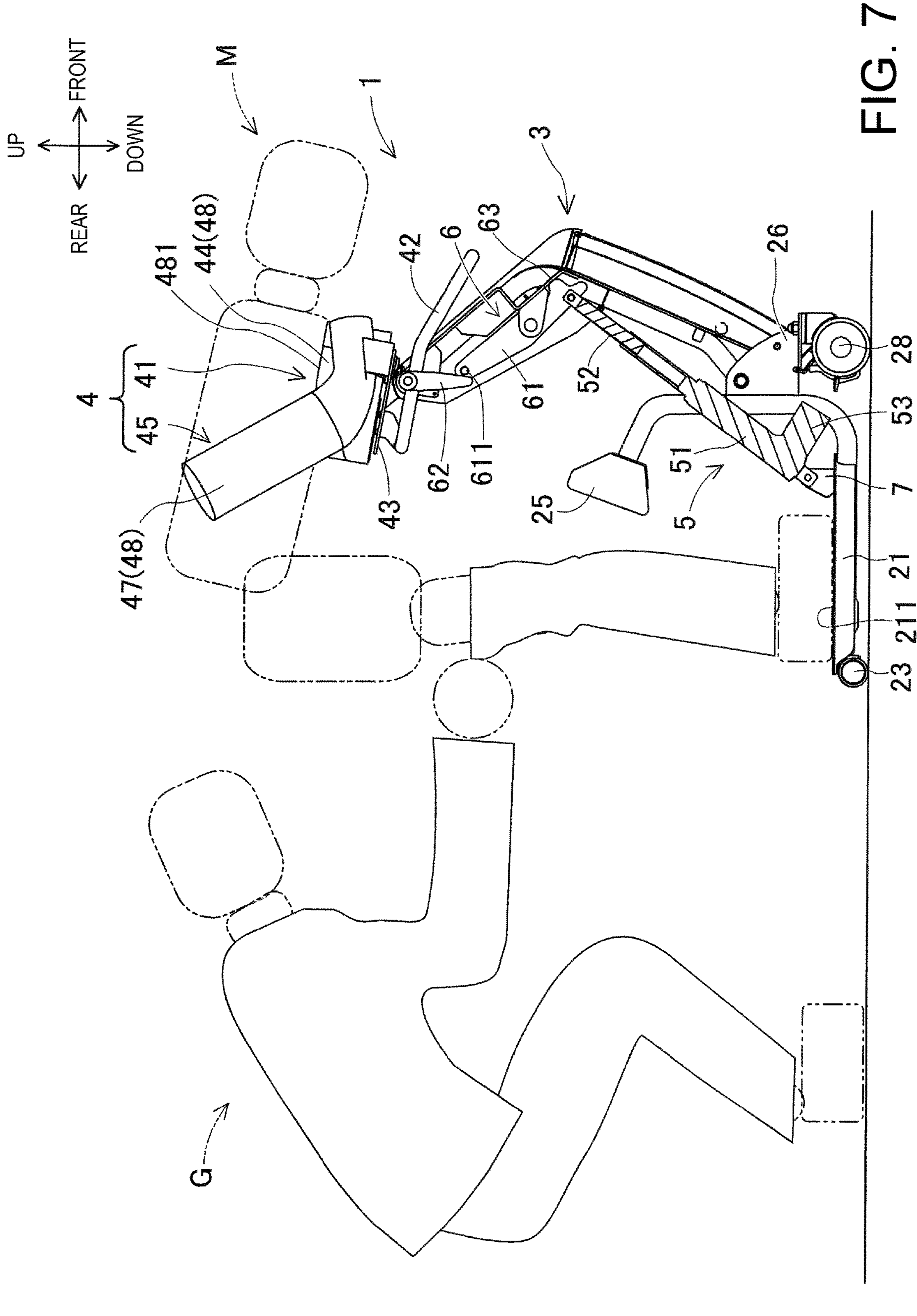
FIG. 7 is a diagram showing a process in which the caregiver prepares for the undressing of the lower body of the care receiver.

After the process of S15, caregiver G performs preparation for undressing the lower body of care receiver M (S16: lower body undressing preparation step, see FIG. 7). In the process of S16, caregiver G lowers the clothes worn on the lower body of care receiver M to a position below the buttocks. Specifically, caregiver G lowers the clothes worn on the lower body of care receiver M to a position above the knees or around the ankles. Thereafter, care receiver G moves chair C2 for bathroom-use to the rear of assistance device 1 and positions chair C2 to the rear of care receiver M (S17). Examples of chair C2 for bathroom-use include a bath stool and a bathroom wheelchair.

Figure 8:
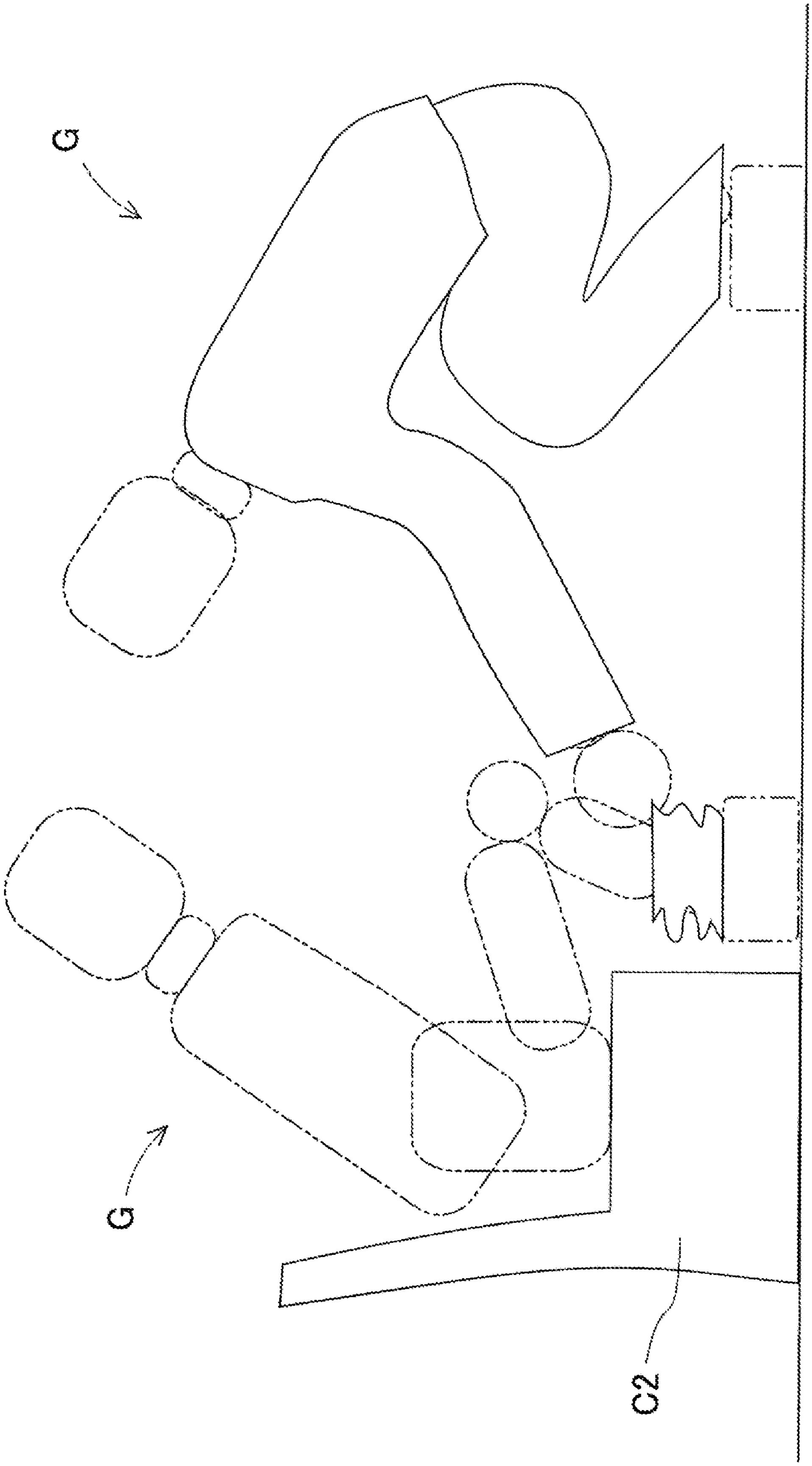
FIG. 8 is a diagram showing a process in which the caregiver assists the undressing of the lower body of the care receiver.

After the process of S17, caregiver G lowers support section 4 by operating operating device 8, causing care receiver M to sit in chair C2 (S18). In S18, caregiver G presses down button 82 of operating device 8 continuously to lower supporting section 4 to the state shown in FIG. 1. Subsequently, caregiver G separates care receiver M from support section 4 and retracts assistance device 1 from the front of chair C2 (S19). Thereafter, caregiver G assists in the removing of clothes from the lower body of care receiver M while care receiver M is seated in chair C2 (S20: lower body undressing process, see FIG. 8). In the process of S20, caregiver G removes the clothes of care receiver M which had been lowered to a position below the buttocks during the process of S16. Thereafter, the bathing assistance shifts from the undressing step (S1) to the bathing step (S2).

As described above, in the undressing step (S1), caregiver G performs preparation for undressing of the lower body when care receiver M lifts his/her buttocks and then performs the undressing of the lower body when care receiver M is seated. In this way, caregiver G reduces the burden on care receiver M when undressing the lower body.

That is, in a case where caregiver G removes clothes worn on the lower body while care receiver M has his/her buttocks raised, it is necessary to perform a step of lifting the feet of care receiver M from footrest 21. Such a step may be a burden on care receiver M. Further, while care receiver M is placed in a one-legged standing state, care receiver M may fall. On the other hand, in the undressing step (S1), caregiver G performs preparation for undressing the lower body and then completes the undressing of the lower body while care receiver M is seated. In this manner, caregiver G can reduce the burden on care receiver M and safely undress the lower body of care receiver M.

In addition, in a case where caregiver G performs assistance corresponding to preparation for undressing the lower body described above while care receiver M is seated, it is necessary to perform a step of temporarily lifting the buttocks of care receiver M, a step of pulling the clothes worn by care receiver M with force, and the like. However, it is not easy for caregiver G to smoothly perform these steps, and there is a possibility care receiver M will be burdened. On the other hand, in the undressing step (S1), caregiver G prepares for undressing the lower body in advance when care receiver M has his/her buttocks lifted. As a result, caregiver G can smoothly undress the lower body of care receiver M and reduce the burden on care receiver M. It should be noted that as long as it is easy to prepare for undressing the lower body while care receiver M is seated, caregiver G may perform the processes of S16 and S20 together when performing the process of S11.

Here, in the above-described undressing step (S1), a case in which caregiver G moves to the bathroom after performing the undressing of the upper body in the clothes-changing space was described, but the present invention is not limited to this. That is, caregiver G may perform the entire dressing step (S1) in the clothes-changing space or the bathroom. It should be noted that in a case where undressing the lower body is performed in the clothes-changing space, caregiver G can easily move from the clothes-changing space to the bathroom by seating care receiver M in the bathroom wheelchair in the process of S18 described above.

4-2: Bathing Step

Figure 9:
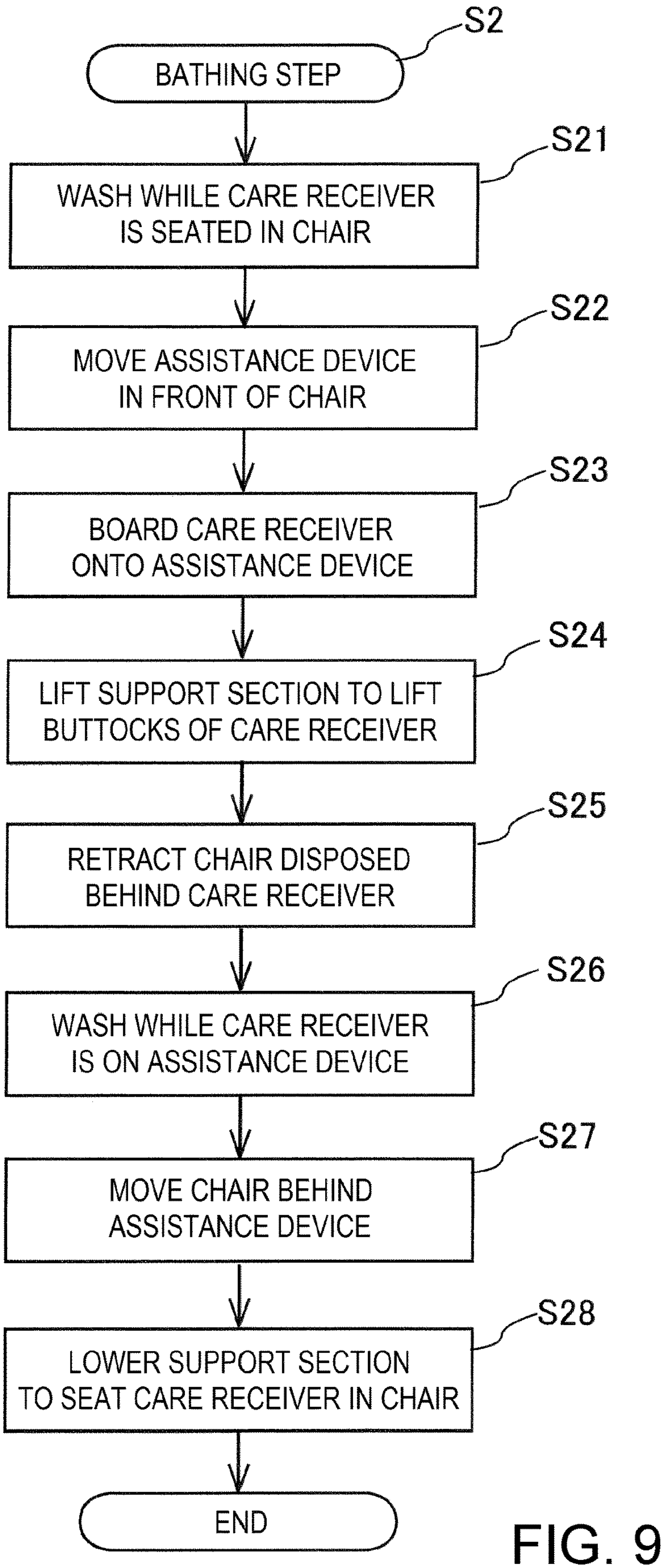
FIG. 9 is a flowchart showing a bathing step executed during bathing assistance.
Figure 10:
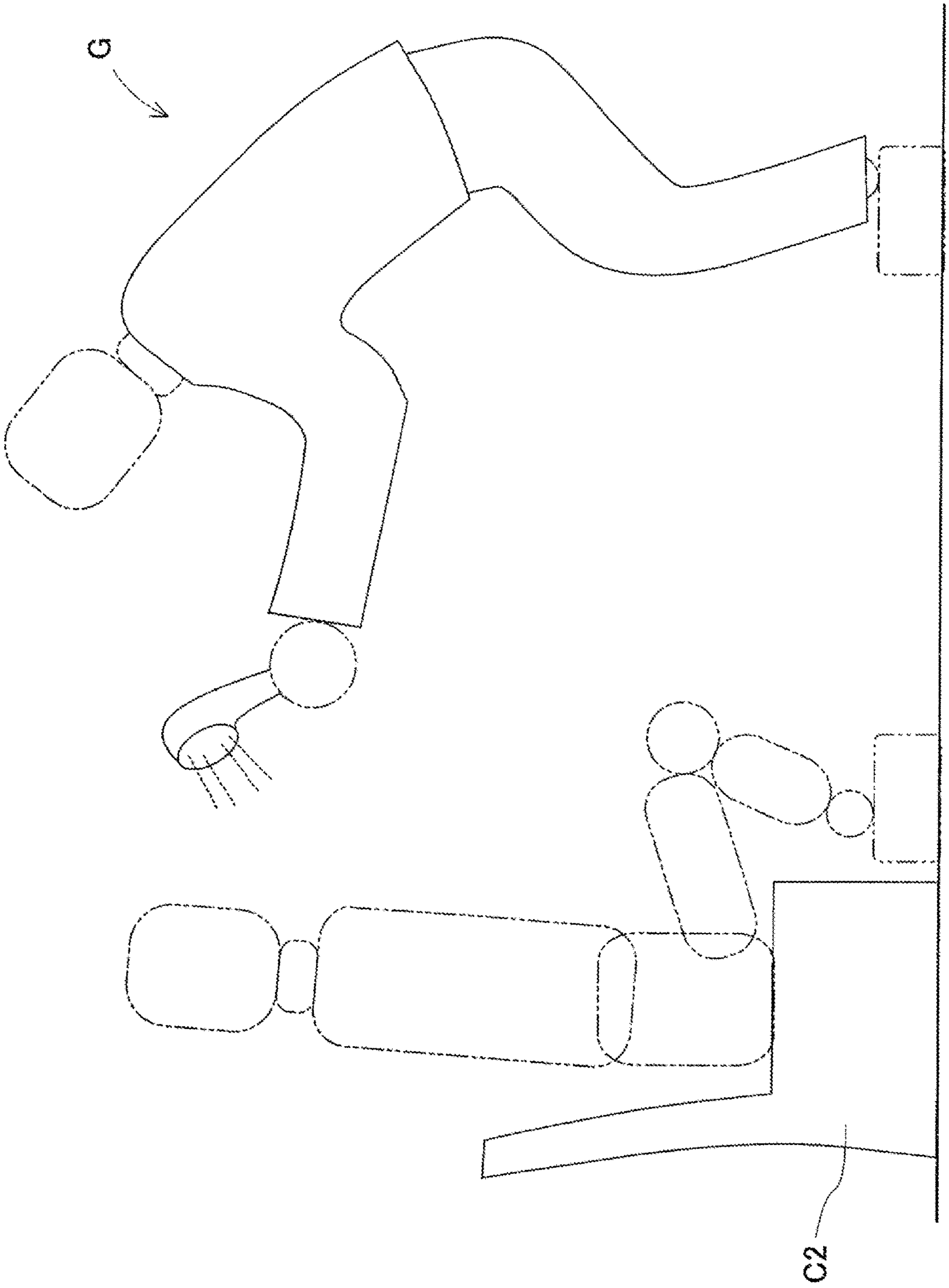
FIG. 10 is a diagram showing a process in which the caregiver performs bathing assistance of the care receiver while the care receiver is seated.

Next, bathing step (S2) will be described with reference to the flowchart shown in FIG. 9. As shown in FIG. 9, as a first process performed in the bathing step (S2), caregiver G seats care receiver M in chair C2 by lowering support section 4 and washes the body of care receiver M while care receiver M is pulled away from support section 4 (S21: front side washing step, see FIG. 10). In S21, caregiver G mainly assists the washing of the body from the front of care receiver M. Specifically, caregiver G washes the part of the entire body of care receiver M that can be washed without hesitation even while care receiver M is kept seated in chair C2 (including the underarms, the head hair, the soles of the feet, and the like). In the process of S21, care receiver M may wash his/her body by himself/herself to the extent that he/she can manage to do so, and caregiver G need not necessarily perform all the body washing assistance of care receiver M.

After the process of S21, caregiver G moves assistance device 1 in front of chair C2 and disposes assistance device 1 in front of care receiver M (S22). Subsequently, caregiver G boards care receiver M seated in chair C2 onto assistance device 1 (S23: boarding step, see FIG. 1). Thereafter, caregiver G operates operating device 8 to lift support section 4 so that the buttocks of care receiver M are lifted from chair C2 (S24, see FIG. 3).

Figure 11:
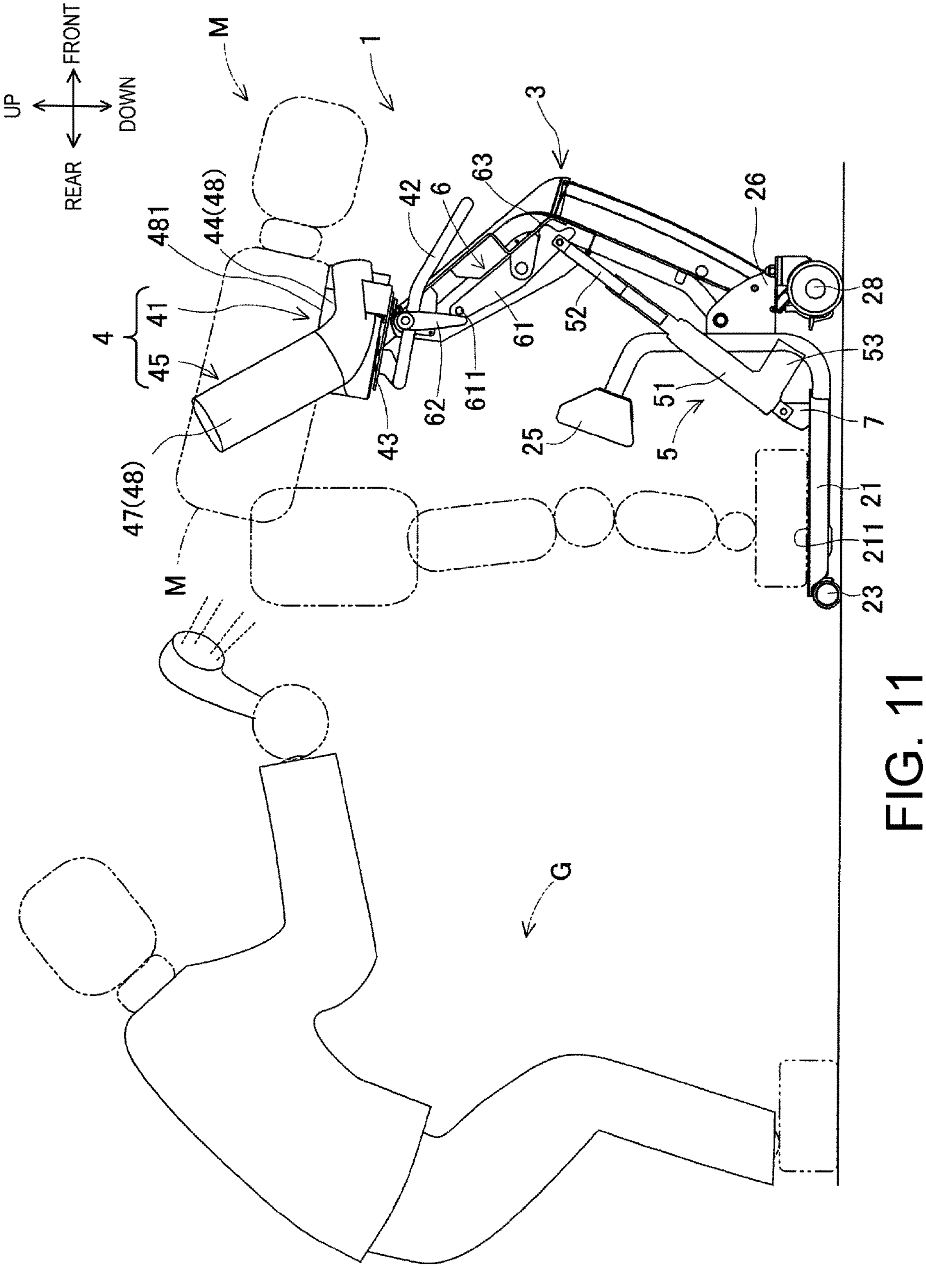
FIG. 11 shows a process in which a caregiver assists in bathing the care receiver while the buttocks of the care receiver are lifted.

After the process of S24, caregiver G retracts chair C2 disposed behind assistance device 1 (S25). Thereafter, caregiver G washes the body of care receiver M while care receiver M is on board assistance device 1 (S26: Rear side washing step, see FIG. 11). Specifically, caregiver G assists in washing the body of care receiver M from the rear of care receiver M while supporting the upper body of care receiver M from the front using assistance device 1. As a result, caregiver G can wash the buttocks and the periphery of the buttocks of care receiver M, which are difficult to wash while care receiver M is seated in chair C2.

In this case, by using assistance device 1, in supporting care receiver M, whose buttocks are lifted, from the front, caregiver G can eliminate the necessity for caregiver G different from caregiver G who assists in bathing care receiver M from the rear of care receiver M. In this manner, assistance device 1 reduces the number of caregivers G required to assist care receiver M in bathing. In addition, since caregiver G can leave the role of supporting care receiver M, whose buttocks are lifted, from the front to assistance device 1, it is possible to reduce the physical burden on caregiver G.

Further, care receiver M can easily place the weight of care receiver M in support section 4. That is, care receiver M does not need to pay attention to caregiver G compared with the case where caregiver G supports the upper body. As a result, assistance device 1 safely performs bathing assistance of care receiver M while reducing the burden on both caregiver G and care receiver M.

After the process of S26, caregiver G moves chair C2 behind assistance device 1 and disposes chair C2 to the rear of care receiver M (S27). Subsequently, caregiver G lowers support section 4 to seat care receiver M in chair C2 (S28, see FIG. 1). Thereafter, caregiver G separates care receiver M from support section 4. Subsequently, when immersing care receiver M in a bathtub, caregiver G continues to perform a series of bathing assistance processes and terminates the bathing step (S2). On the other hand, when caregiver G cannot immerse care receiver M in a bathtub, the bathing step (S2) is terminated as is. When the bathing step (S2) is finished, the bathing assistance transitions to the dressing step (S3).

It should be noted that caregiver G does not necessarily have to lift support section 4 to the state shown in FIG. 3 in the process of S24 described above and may stop lifting support section 4 before the state shown in FIG. 3 is reached. That is, it is sufficient if the buttocks of care receiver M can be lifted from chair C2 to an extent which allows washing of parts that are difficult to wash when care receiver M is seated in chair C2. As described above, assistance device 1 can adjust the up-down amount of support section 4 with respect to base 2 based on the operation of operating device 8 by caregiver G. In this way, assistance device 1 can increase the convenience for caregiver G.

The above-described bathing step (S2) demonstrated an example in which caregiver G washes the body of care receiver M from the front side of care receiver M (S21: front side washing step) and then washes the body from the rear side of care receiver M (S26: rear side washing step), but the present invention is not limited to this. That is, caregiver G may perform assistance for washing the body from the rear side of care receiver M (rear side washing step) and then perform assistance for washing the body from the front side of care receiver M (front side washing step). For example, in a case where caregiver G, after finishing the undressing of the upper body and the undressing of the lower body of care receiver M, boards care receiver M onto assistance device 1 and moves care receiver M from the clothes-changing space to the bathroom, it is possible to efficiently perform the bathing step (S2) by first performing assistance for washing the body from the rear side of care receiver M (rear side washing step).

In the bathing step (S2), caregiver G may omit the processes of S25 and S27 and perform assistance (S26) of washing the body from the rear side of care receiver M while chair C2 remains disposed behind assistance device 1.

4-3: Dressing Step

Figure 12:
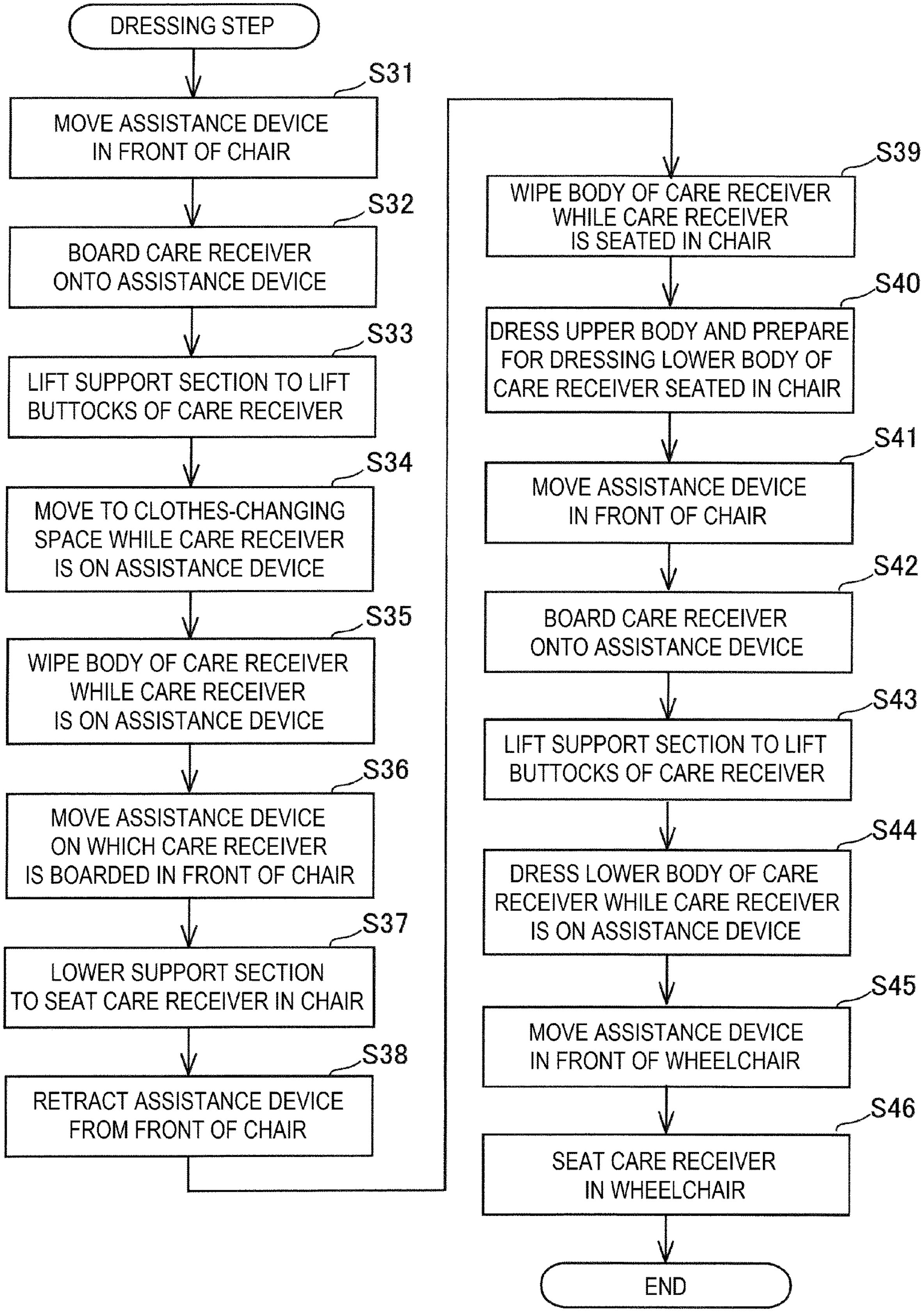
FIG. 12 is a flowchart showing a dressing step executed during bathing assistance.

Next, the dressing step (S3) will be described with reference to the flowchart shown in FIG. 12. As shown in FIG. 12, as a first process performed in the dressing step (S3), caregiver G moves assistance device 1 to an area in front of chair C2 in which care receiver M is seated and disposes assistance device 1 in front of care receiver M (S31). Subsequently, caregiver G boards care receiver M onto assistance device 1 (S32, see FIG. 1). Thereafter, caregiver G operates operating device 8 to lift support section 4 so that the buttocks of care receiver M are lifted from chair C2 (S33, see FIG. 3).

After the process of S33, caregiver G moves care receiver M from the bathroom to the clothes-changing space while care receiver M is on board assistance device 1 (S34). Thereafter, caregiver G wipes the body of care receiver M while care receiver M is on board assistance device 1 (S35). In the process of S35, caregiver G wipes off moisture adhering to at least the parts of the body of care receiver M that are difficult to wipe when care receiver M is seated (i.e., the buttocks, the periphery of the buttocks, and the like).

After the process of S35, caregiver G moves assistance device 1 on which care receiver M is boarded to a position in front of chair used in clothes-changing space and disposes the chair to the rear of care receiver M (S36). Examples of chairs used in the clothes-changing space room include a chair prepared in advance in the clothes-changing space, a bathroom wheelchair, and the like. In addition, in the process of S36, caregiver G may move the chair instead of moving assistance device 1.

After the process of S36, caregiver G lowers support section 4 to seat care receiver M in chair (S37). Then, caregiver G separates support section 4 from care receiver M, retracts assistance device 1 from the front of chair (S38), and wipes the body of care receiver M while care receiver M is seated in chair (S39). In the process of S39, care receiver M may wipe his/her body by himself/herself to the extent that he/she can manage to do so.

After the process of S39, caregiver G assists in undressing the upper body of care receiver M while care receiver M is placed in the chair and prepares for dressing of the lower body of care receiver M (S40). In the process of S40, caregiver G prepares for dressing the lower body of care receiver M by passing the legs through the clothes to be worn on the lower body. Thereafter, caregiver G moves assistance device 1 to a position in front of the chair and disposes assistance device 1 in front of care receiver M (S41).

After the process of S41, caregiver G boards care receiver M onto assistance device 1 (S42, see FIG. 1). Subsequently, caregiver G operates operating device 8 to lift support section 4 to lift the buttocks of care receiver M (S43). Thereafter, caregiver G assists in dressing the lower body of care receiver M while care receiver M is on board assistance device 1 (S44).

After the process of S44, caregiver G moves assistance device 1 while care receiver M is on board and disposes assistance device 1 in front of wheelchair C1 used for moving to the clothes-changing space (S45). In the process of S45, caregiver G may move wheelchair C1 to dispose wheelchair C1 behind assistance device 1 instead of moving assistance device 1. After the process of S45, caregiver G seats care receiver M in wheelchair C1 by lowering support section 4 and separates care receiver M from support section 4 (S46). As a result, the dressing step (S3) is finished, and the entire bathing assistance is finished.

In the dressing step (S3), caregiver G wipes the body of care receiver M after moving care receiver M from the bathroom to the clothes-changing space and assists care receiver M in dressing. However, the present invention is not necessarily limited to this. For example, caregiver G may perform the entire dressing step (S3) in the bathroom. Further, in the process of S28 executed in the bathing step (S2), caregiver G may seat care receiver M in the bathroom wheelchair and move care receiver M from the bathroom to the clothes-changing space.

As described above, by supporting the upper body of care receiver M from the front using assistance device 1 when assisting care receiver M in bathing in the bathroom, caregiver G can maintain a state in which care receiver M has his/her buttocks lifted and the body of care receiver M can be washed in this state. In this manner, when assisting the bathing of care receiver M, caregiver G can wash the buttocks and the periphery of the buttocks of care receiver M without hesitation while reducing the physical burden on caregiver G by assisting the bathing using assistance device 1.

Further, caregiver G can wash the buttocks and the periphery of the buttocks of care receiver M while the upper body of care receiver M is supported with support section 4. In this case, care receiver M can easily place the weight of care receiver M in support section 4 compared with the case where the upper body is supported by caregiver G. As a result, caregiver G can safely assist care receiver M in bathing.

Further, in the bathing assistance of care receiver M, caregiver G includes a step of washing the body of care receiver M while care receiver M is seated in chair C2 (front side washing step) and a step of washing the body of care receiver M while the buttocks of care receiver M are lifted from chair C2 (rear side washing step). As a result, caregiver G can thoroughly wash the entire body of care receiver M.

5. Other

Although the assistance method using the assistance device disclosed in the present specification has been described above based on the above embodiment, the present invention is not limited to the above embodiment and it can be easily inferred that various modifications and improvements can be made without departing from the gist of the present disclosure. For example, the procedure of bathing assistance described in the above embodiment is an example, and it is needless to say that the procedure of bathing assistance can be appropriately changed according to the equipment provided in the clothes-changing space or the bathroom, the state of care receiver M, or the like.

REFERENCE SIGNS LIST

1: Assistance device, 2: Base, 4: Support section, 5: Actuator (driving section), 8: Operating device, 481: Slip-preventing portion, G: Caregiver, M: Care receiver, S11: Upper body undressing step, S16: Lower body undressing preparation step, S20: Lower body undressing step, S21: Front side washing step, S23: Boarding step, S26: Rear side washing step

What is claimed is:

1. An assistance method using an assistance device, the assistance device comprising a base having a footrest surface for receiving feet of a care receiver, a support section configured to lift and lower the upper body of the care receiver with respect to the base while supporting the upper body of the care receiver from a front of the care receiver, the assistance method comprising:

applying a slip prevention treatment on the footrest surface by forming uneven surfaces on the footrest surface to prevent the care receiver from slipping on the feet;

providing a slip-preventing portion by forming uneven surfaces at a portion of the support section in contact with a front side of the care receiver;

boarding the seated care receiver onto the assistance device;

resting the seated care receiver on the support section such that the upper body of the care receiver being in contact with the support section;

moving the upper body of the care receiver, that has rested on the support section, obliquely upward toward the front by lifting the support section to rise buttocks of the care receiver while supporting the upper body of the care receiver;

washing a body of the care receiver while buttocks of the care receiver are lifted by lifting the support section.

2. The assistance method using the assistance device according to claim 1, further comprising:

seating the care receiver by lowering the support section and washing the body of the care receiver by the caregiver while the care receiver is pulled away from the support section.

3. The assistance method using the assistance device according to claim 2, further comprising:

removing clothes worn on the upper body of the care receiver while the care receiver is seated;

lowering clothes worn on a lower body of the care receiver to at least below the buttocks while the buttocks of the care receiver are lifted by lifting the support section; and seating the care receiver by lowering the support section and removing the clothes lowered below the buttocks of the care receiver while the care receiver is pulled away from the support section.

4. The assistance method using the assistance device according to claim 2, further comprising adjusting a position of the support section relative to the base during washing the body of the care receiver while buttocks of the care receiver are lifted by the support section.

5. The assistance method using the assistance device according to claim 1, further comprising:

removing clothes worn on the upper body of the care receiver while the care receiver is seated;

lowering clothes worn on a lower body of the care receiver to at least below the buttocks while the buttocks of the care receiver are lifted by lifting the support section; and seating the care receiver by lowering the support section and removing the clothes lowered below the buttocks of the care receiver while the care receiver is pulled away from the support section.

6. The assistance method using the assistance device according to claim 1, further comprising adjusting a position of the support section relative to the base washing the body of the care receiver while buttocks of the care receiver are lifted by the support section.

7. The assistance method using the assistance device according to claim 5, further comprising adjusting a position of the support section relative to the base during washing the body of the care receiver while buttocks of the care receiver are lifted by the support section.

* * * * *